UNITED STATES PATENT OFFICE.

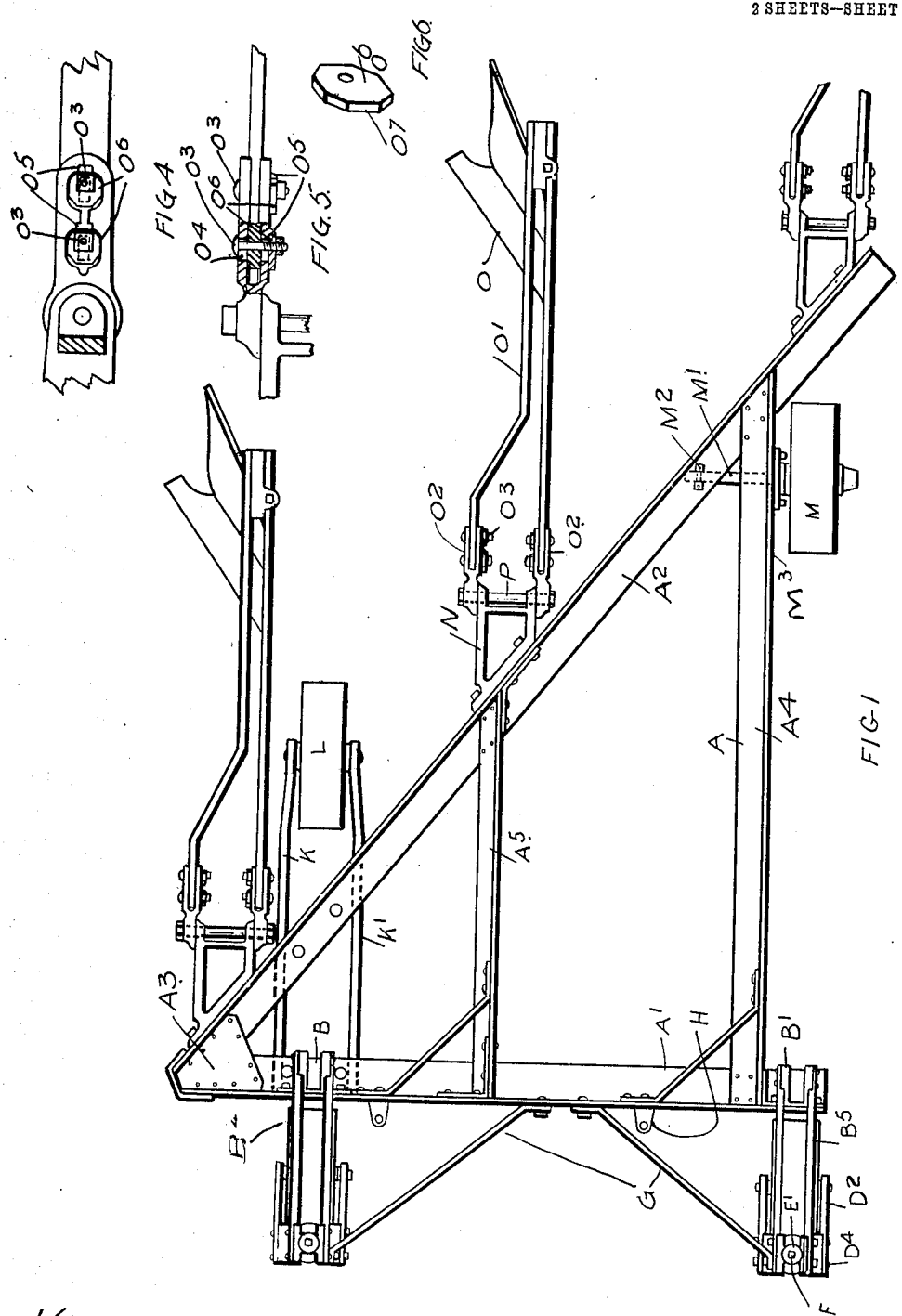

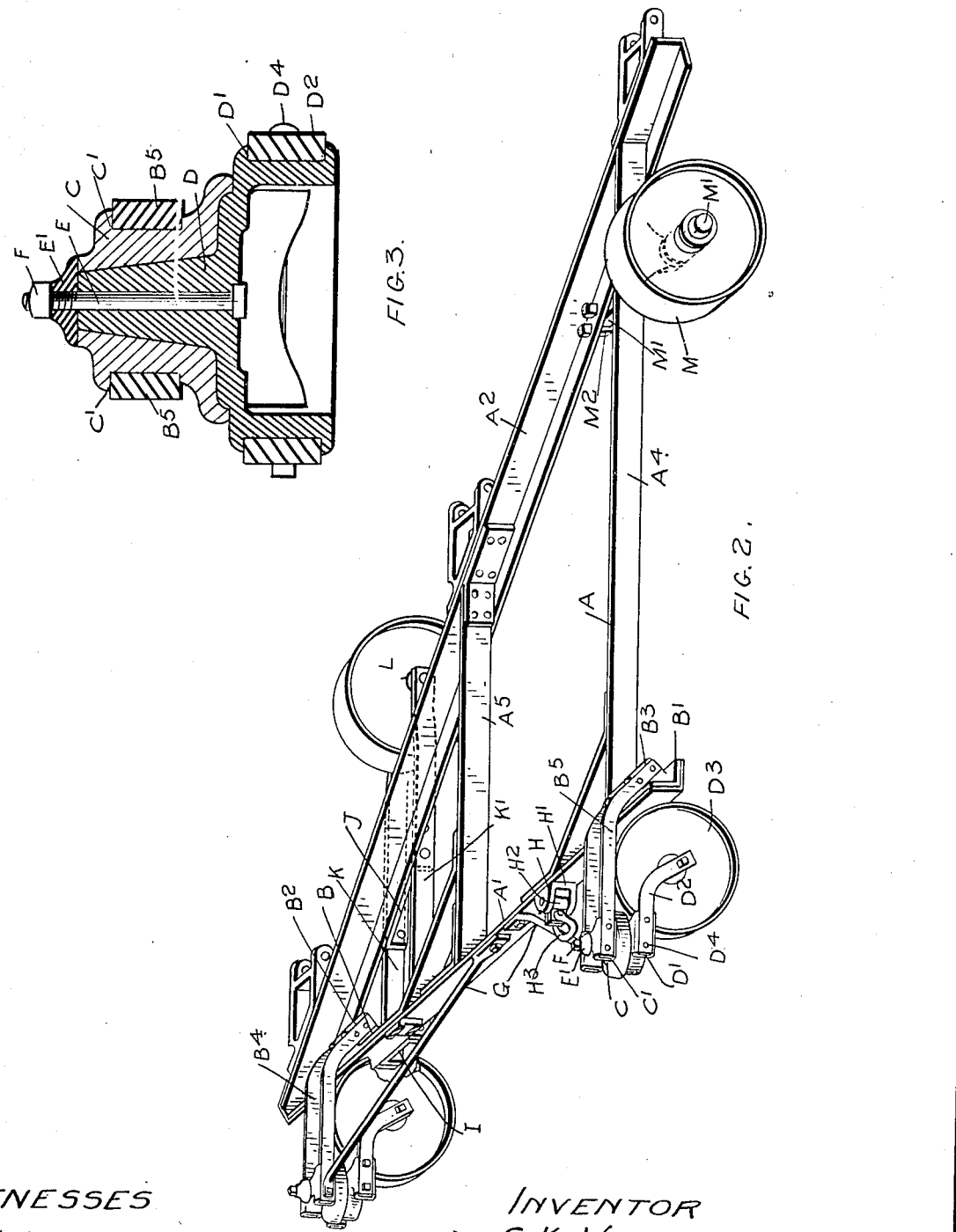

GEORGE KENT WEDLAKE, OF BRANTFORD, ONTARIO, CANADA, ASSIGNOR TO COCKSHUTT PLOW CO., LIMITED, OF BRANTFORD, CANADA, A CORPORATION.

TRACTION-PLOW.

No. 926,306.　　　　Specification of Letters Patent.　　　Patented June 29, 1909.

Application filed July 25, 1908. Serial No. 445,403.

*To all whom it may concern:*

Be it known that I, GEORGE KENT WEDLAKE, of the city of Brantford, in the county of Brant, in the Province of Ontario, Canada, have invented certain new and useful Improvements in Traction-Plows, and Particularly Traction Gang-Plows, of which the following is a specification.

My invention relates to improvements in traction plows.

One object of the invention is to so support the triangular frame or hitch of the plow as to keep it on a level with the ground and consequently with the engine, so as to insure even running of the plow.

Another object of the invention is to devise a form of running support for the plow frame or hitch, which will enable it to be drawn easily and without gathering stubble, grass or other obstructing material, which would impede its progress.

Another object of the invention is to devise such a form of running support for the plow frame or hitch as to enable it to be turned readily.

A further object of the invention is to improve the construction of the plow drag beams so that they may be readily connected to the frame or hitch and adjusted to proper drawing position, that is—parallel to the line of draft, and in oblique alinement with each other.

A still further object of the invention is to improve the construction of the plow drag beams and their connections to the frame or hitch, so that when connected and adjusted the plow drag beams may be held rigid laterally though moving freely up or down.

To effect the first mentioned object I have constructed my traction gang plow with leading supporting wheels, an intermediate supporting wheel journaled in the rear of and near the narrow forward end of the triangular frame or hitch and a rear supporting wheel journaled in proximity to the rear apex of the triangular frame or hitch.

To effect the second mentioned object I have made all the supports of the plow frame or hitch, wheels or running supports.

To effect the third mentioned object I have made the leading wheels or running supports of the plow frame or hitch, caster wheels.

To effect the fourth and fifth mentioned objects I have provided for each plow body a bracket secured to the rear obliquely set bar of the triangular frame having two rearwardly extending sides or lugs parallel to the line of draft and two drag beams each having forwardly extending bars secured to the same, and held to pivot upon the bracket, and one of said bars having a device for longitudinally adjusting the drag beam to which it is attached, the whole being constructed and arranged as hereinafter more particularly explained.

Figure 1, is a plan view of a traction gang plow having the triangular frame or hitch and provided with my improvements. Fig. 2, is a perspective view of the triangular frame or hitch. Fig. 3, is a sectional detail showing a preferred form of vertical journal for a caster wheel at the front of a bracket attached to the front bar of the frame. Fig. 4, is a sectional detail elevation passing through the center of one of the cross bolts connecting one set of plow drag beams to the plow frame or hitch. Fig. 5, is a plan view of Fig. 4, partially in section. Fig. 6, is a detail of the eccentric washer.

In the drawings like letters of reference indicate corresponding parts in each figure.

A is a triangular frame or hitch comprising the front bar A' which is designed to be drawn at right angles to the line of draft, an oblique rear bar $A^2$ which is connected to the front bar by a corner angle plate $A^3$ and a side bar $A^4$, which is suitably bolted to the front and rear bars and substantially lies parallel to the line of draft. $A^5$ is a reinforcing bar suitably secured to the front and rear bars. The frame is otherwise braced as indicated. All the bars A' $A^2$ and $A^4$ are angle bars.

The leading wheels or running supports are preferably located forward of the triangular frame, so that the frame may be lower than would be possible if the wheels were under the frame, but it is possible by raising the frame and lowering the devices for hitching the frame to the engine and hitching the plow drag beams to the frame to allow the forward leading wheels or running supports to run or turn under the frame.

I have illustrated in the drawings, and now proceed to describe, though without limiting myself thereto, a form of said leading wheels or running supports and the attachment thereof to the triangular frame which I have devised and prefer to employ.

B and B' are brackets suitably bolted to the bar A′, and provided with end grooves B² and B³ in which are held in parallel arrangement pairs of side bars B⁴ and B⁵ respectively. The bars B⁴ and B⁵ are bent as indicated, so that the front ends lie substantially parallel with the plane of the frame.

C is a bearing block having grooves C′ into which extend the bars B⁵. Suitable bolts extend through the bars into the block and thereby secure it in position on the ends of the bars.

D is a trunnion, which is preferably tapered at the top and extends through a correspondingly tapered hole in the bearing block C. The lower portion of the trunnion D flares outward as indicated and is provided with grooves D′ into which fit the bars D² in the lower ends of which is carried a wheel D³.

D⁴ are bolts which extend through to the flaring portion of the trunnion and bars D².

E is a bolt which passes up through the tapered trunnion and through a flaring washer E′, which rests on top of the block C. A suitable nut F is placed on the top of the bolt to secure it in position and thereby complete the bearing and caster wheel.

G are braces extending from the front bar A to the inner bars B⁴ and B⁵.

H and H′ are hitching blocks, which are secured to the front bar A′, and consist each of the bracket H′, sleeve H², held by a bolt in the bracket and the clevis H³. There is however no special feature about the hitching blocks.

I and J are reverse U-shape plates bolted to the under side of the front bar A′ and the rear bar A² respectively and having their sides projecting downward and parallel to the line of draft. They are situated on the narrow side of the triangular frame and near the junction of the front bar A′ with the rear bar A² substantially opposite to each other, and their sides or downward projections are respectively in line with each other.

K and K′ are bars secured at the front and intermediate of their length to the bars I and J respectively and extending rearward parallel to the line of draft far enough to permit the wheel L to be journaled in their ends back of the oblique bar A².

L is a supporting wheel the axle of which is journaled in the ends of the bars K and K′ in rear of the bar A².

M is a supporting wheel located on the outside of and near the rear end of the side bar A⁴ and in proximity to the rear apex of the triangular frame or hitch, and has an axle M′ held beneath the bar A² by the U-bolt M² and beneath the bar A⁴ by the bearing bracket M³.

N are brackets having oblique front ends which are bolted to the oblique rear bar A² of the triangular frame. The rearwardly projecting sides of the brackets are parallel to the line of draft and are sufficiently far apart to give a laterally rigid bearing for the double plow drag beams. It will be understood that there is one bracket N for each plow and set of drag beams.

O is a plowbody and O′ the two plow drag beams thereof, which have attached to the front of the same the forked connecting bars O² by the bolts O³.

Extending through the longitudinal slots O⁴ in one of the forked members of the bar (see Figs. 4 and 5) are projections O⁵ extending from the bar O² to the rear of the slots O⁴.

O⁶ are eccentric washers through which and the slots O⁴ and the plow drag beam O′ the bolts O³ pass. The washers O⁶ are provided with flat sided portions O⁷ designed to abut against the projections O⁵. The washers O⁶ being eccentric to the bolts O³ the position of the drag beam may be adjusted longitudinally between the forks of the bar O by loosening the bolts O³ and turning the washers so as to bring a different side of the washers against the projection O⁵, thus alining each set of plow drag beams with the other sets and at right angles to the front of the frame or parallel to the line of draft. In the case of each set of plow drag beams the connecting bars O² are provided in the forward portion of their sides which fit close against the sides of the corresponding bracket with orifices and through these orifices, and orifices in the rear portion of the sides of the corresponding bracket N, a cross bolt P extends, the whole serving to give a bearing laterally rigid for each set of plow drag beams and consequently for the plowbody and yet a freely moving swinging or pivotal bearing for the raising or rising and falling of the plowbody.

By the leading wheels or running supports hereinbefore described, and by the wheels L and M it will be seen that the plow frame or hitch will be properly supported, and yet it can be drawn readily and turned readily. It will be further seen that said wheel or running supports also serve to keep the frame or hitch of the plow substantially parallel with the surface of the ground, which is an important feature as the plow is thereby prevented from dipping too deeply into the solid, or rising so much that it will not follow the undulations of the ground properly.

The connection of each plowbody to the triangular frame or hitch by means of the two plow drag beams connecting bars and brackets N is also strong and holds the plowbody rigid laterally while permitting of its free movement up and down notwithstanding the level position maintained by the frame or hitch support as hereinbefore described.

What I claim as my invention is:

1. In a traction gang plow the combination with the triangular plow frame of brackets secured to the front bar, bars secured to the brackets and extending forwardly of the frame and caster wheels suitably journaled and supported in the front of the bars as and for the purpose specified.

2. In a traction gang plow the combination with the triangular plow frame of brackets secured to the front bar, bars secured to the brackets and extending forwardly of the frame and caster wheels suitably journaled and supported in the front of the bars and braces connecting the bars to the front bar of the frame as and for the purpose specified.

3. In a traction gang plow a support for the front bar of the triangular plow frame comprising the forwardly extending pair of bars suitably secured to the front bar, a bearing block held in the front end of the bars and a caster wheel comprising a trunnion tapered at the upper end, an axle supporting bars and wheel and a bolt and washer, the bolt extending up through the tapered portion of the trunnion and provided with a suitable nut as and for the purpose specified.

4. In a traction gang plow, a triangular frame having its front bar arranged transversely to the line of draft, arms projecting forwardly from the front bar, caster wheels carried by the forward ends of said arms, a supporting wheel carried by the frame in rear of its inclined rear bar and in proximity to the narrow side of the frame, a supporting wheel carried by the frame at the wide side in front of the inclined rear bar, and plows arranged in rear of the said inclined rear bar having their beams connected thereto.

5. In a traction gang plow the combination with a triangular frame and suitable wheels for the front of the frame, of bars parallel to the line of draft and reverse U-shape plates of which the downward projecting sides are parallel to the line of draft and to which said bars are secured located at the narrow side of the triangular frame near its forward acute angle apex and attached to the front and rear bars respectively, and a supporting wheel having the axle thereof journaled in the rear ends of the parallel arranged bars and behind the rear oblique bar of the frame, and a supporting wheel journaled in bearings outside the side bar of the triangular frame near its rear acute angle apex, as and for the purpose specified.

6. In a traction gang plow the combination with the triangular plow frame and rear oblique bar thereof, of brackets having oblique front ends suitably secured to the rear oblique bar of the frame and having their sides substantially parallel to the line of draft and sufficiently wide apart to afford a laterally rigid bearing for the two plow drag beams and plow bodies, each having two plow drag beams pivotally swung on a cross bolt extending through the sides of the corresponding bracket near their rear ends, as and for the purpose specified.

7. In a traction gang plow the combination with the triangular plow frame and rear oblique bar thereof, of brackets having oblique front ends suitably secured to the oblique rear bar of the frame and having sides substantially parallel to the line of draft and sufficiently wide apart to afford a laterally rigid bearing for the two plow drag beams and plow bodies each having two drag beams and forked bars bolted to the front ends of the drag beams and forming an extension of each of the drag beams, and a cross bolt extending through the sides of each set of forked bars near their forward ends and through the sides of the corresponding bracket near their rear ends, as and for the purpose specified.

8. A traction gang plow comprising a triangular frame having a rear oblique bar, brackets secured to said bar, plow bodies, two drag beams connected to each plow body and adjustable connecting means between the front end of one of the drag beams of each plow body and its bracket so that the plow bodies may be adjusted parallel to the line of draft.

9. In a traction gang plow, the combination with a rear frame bar and brackets attached to said rear bar, of a set of two forked bars for each bracket, one of each set of forked bars being longitudinally slotted and provided with projections extending from the rear of the slots, two plow drag beams for each set of forked bars, eccentric flat sided washers abutting the projections on each slotted bar, and bolts extending through each washer and slot and the corresponding drag beam ends and the other forked bar of the set, as and for the purpose specified.

10. In a traction gang plow, the combination with the triangular plow frame having a rear oblique bar, brackets attached to said rear bar, of a set of two forked bars for each bracket, one of each set of forked bars being longitudinally slotted and provided with projections extending from the rear of the slots, two plow drag beams for each set of forked bars, eccentric flat sided washers abutting the projections on each slotted bar, and bolts extending through each washer and slot and the corresponding drag beam ends and the other forked bar of the set, as and for the purpose specified.

GEORGE KENT WEDLAKE.

Witnesses:
M. J. KEANE,
JESSIE WEDLAKE.